US008680963B2

(12) United States Patent
Rowse

(10) Patent No.: US 8,680,963 B2
(45) Date of Patent: Mar. 25, 2014

(54) METHOD OF PROVIDING A RADIO SERVICE AT A REMOTE TERMINAL

(75) Inventor: Graham Rowse, Hampshire (GB)

(73) Assignee: Nokia Corporation, Espoo (FI)

( * ) Notice: Subject to any disclaimer, the term of this patent is extended or adjusted under 35 U.S.C. 154(b) by 1247 days.

(21) Appl. No.: 11/629,012

(22) PCT Filed: Jun. 27, 2005

(86) PCT No.: PCT/IB2005/002088
§ 371 (c)(1),
(2), (4) Date: Aug. 1, 2008

(87) PCT Pub. No.: WO2006/003511
PCT Pub. Date: Jan. 12, 2006

(65) Prior Publication Data
US 2009/0015370 A1    Jan. 15, 2009

(30) Foreign Application Priority Data
Jun. 30, 2004   (GB) .................................. 0414576.9

(51) Int. Cl.
*G05B 19/00*   (2006.01)
(52) U.S. Cl.
USPC ......... 340/5.2; 340/7.21; 340/7.25; 340/10.1; 340/10.2; 340/10.3; 340/10.31; 340/10.32; 340/10.33; 340/10.34; 340/10.4; 340/10.41; 340/10.42; 340/10.5; 340/10.51; 340/10.52; 340/10.6; 235/375; 235/376; 235/377; 235/378; 235/379; 235/380; 235/381; 235/382; 235/383; 235/384; 235/385; 370/329; 370/330; 370/336; 370/342; 455/15; 455/47; 455/419; 455/503

(58) Field of Classification Search
USPC ......... 340/10.1–10.6, 572.1–572.9, 5.2, 7.21, 340/7.25; 235/375–385; 370/329, 330, 336, 370/342; 455/15, 47, 419, 503
See application file for complete search history.

(56) References Cited

U.S. PATENT DOCUMENTS 2,469,555 A * 5/1949 Hitchcock .................... 342/367
4,553,262 A * 11/1985 Coe .................................. 455/15
4,586,081 A * 4/1986 St. Arnaud et al. ........... 380/238

(Continued)

FOREIGN PATENT DOCUMENTS

EP    0 347 401    12/1989
EP    0961193 A2   12/1999

(Continued)

OTHER PUBLICATIONS

"Digital Audio Broadcasting (DAB); VHF/FM Broadcasting; cross-referencing to simulcast DAB services by RDS-ODA 147", ETSI EN 301 700 V1.1.1, Mar. 2000, 14 pgs.

(Continued)

*Primary Examiner* — George Bugg
*Assistant Examiner* — Paul Obiniyi
(74) *Attorney, Agent, or Firm* — Harrington & Smith

(57) ABSTRACT

A method of providing a service at a remote terminal including receiving information broadcast by a commercial radio station in a broadcast radio channel; discriminating an identifier of an application within the received broadcast information; initiating an authentication process for authenticating broadcast information received via the broadcast channel; and in response to a positive authentication, enabling use of information received via the broadcast radio channel by the identified application.

30 Claims, 1 Drawing Sheet

(56) References Cited

U.S. PATENT DOCUMENTS

| | | | | | |
|---|---|---|---|---|---|
| 4,709,402 | A | * | 11/1987 | Akerberg | 455/503 |
| 4,721,955 | A | * | 1/1988 | Dunkerton et al. | 340/7.25 |
| 4,856,048 | A | * | 8/1989 | Yamamoto et al. | 455/439 |
| 4,955,083 | A | * | 9/1990 | Phillips et al. | 455/47 |
| 4,977,399 | A | * | 12/1990 | Price et al. | 340/7.21 |
| 5,164,904 | A | * | 11/1992 | Sumner | 701/117 |
| 5,182,555 | A | * | 1/1993 | Sumner | 340/905 |
| 5,379,345 | A | * | 1/1995 | Greenberg | 455/2.01 |
| 5,418,787 | A | * | 5/1995 | Tiuraniemi et al. | 370/336 |
| 5,508,731 | A | * | 4/1996 | Kohorn | 725/24 |
| 5,574,966 | A | * | 11/1996 | Barzegar et al. | 725/62 |
| 5,592,469 | A | * | 1/1997 | Szabo | 370/342 |
| 5,625,693 | A | | 4/1997 | Rohatgi et al. | 380/23 |
| 5,734,986 | A | * | 3/1998 | Helders | 455/525 |
| 5,805,573 | A | * | 9/1998 | Umeda | 370/321 |
| 5,857,149 | A | * | 1/1999 | Suzuki | 455/186.1 |
| 5,903,617 | A | * | 5/1999 | Kamalski | 375/354 |
| 6,009,096 | A | * | 12/1999 | Jaisingh et al. | 370/310.1 |
| 6,154,456 | A | * | 11/2000 | Rakib et al. | 370/342 |
| 6,360,106 | B1 | * | 3/2002 | Besson | 455/561 |
| 6,622,007 | B2 | | 9/2003 | Linden | 455/12.1 |
| 6,671,509 | B1 | * | 12/2003 | Tanaka et al. | 455/419 |
| 6,795,413 | B1 | | 9/2004 | Uhlik | 370/330 |
| 6,977,957 | B2 | * | 12/2005 | Sarkar et al. | 375/147 |
| 7,020,165 | B2 | * | 3/2006 | Rakib et al. | 370/485 |
| 7,158,493 | B1 | * | 1/2007 | Uhlik et al. | 370/329 |
| 7,360,078 | B1 | * | 4/2008 | Lebouill | 713/155 |
| 7,409,205 | B2 | | 8/2008 | Mittal | 455/414.1 |
| 7,519,106 | B2 | * | 4/2009 | Sarkar et al. | 375/146 |
| 7,630,346 | B2 | * | 12/2009 | Schein et al. | 370/338 |
| 7,751,367 | B2 | * | 7/2010 | Gaal et al. | 370/332 |
| 7,796,676 | B2 | * | 9/2010 | Barclay | 375/141 |
| 7,853,664 | B1 | * | 12/2010 | Wang et al. | 709/217 |
| 2002/0049037 | A1 | | 4/2002 | Christensen et al. | 455/3.06 |
| 2002/0106987 | A1 | * | 8/2002 | Linden | 455/12.1 |
| 2003/0012164 | A1 | * | 1/2003 | Mizoguchi et al. | 370/338 |
| 2003/0032399 | A1 | * | 2/2003 | Slupe | 455/161.2 |
| 2003/0039361 | A1 | * | 2/2003 | Hawkes et al. | 380/278 |
| 2003/0070179 | A1 | * | 4/2003 | Ritz et al. | 725/119 |
| 2003/0092376 | A1 | * | 5/2003 | Syed | 455/3.06 |
| 2004/0001452 | A1 | * | 1/2004 | Day et al. | 370/310.2 |
| 2004/0091022 | A1 | * | 5/2004 | Sarkar et al. | 375/147 |
| 2004/0098715 | A1 | | 5/2004 | Aghera et al. | 717/173 |
| 2004/0101063 | A1 | * | 5/2004 | Sipila | 375/267 |
| 2004/0199387 | A1 | * | 10/2004 | Wang et al. | 704/243 |
| 2005/0097052 | A1 | * | 5/2005 | Systa et al. | 705/51 |
| 2005/0181818 | A1 | * | 8/2005 | Itaba et al. | 455/525 |
| 2006/0031941 | A1 | * | 2/2006 | Xiao et al. | 726/27 |
| 2006/0168651 | A1 | * | 7/2006 | Araki et al. | 726/6 |
| 2006/0179306 | A1 | * | 8/2006 | Kikkoji et al. | 713/168 |
| 2006/0190980 | A1 | * | 8/2006 | Kikkoji et al. | 725/114 |
| 2006/0259931 | A1 | * | 11/2006 | Kikkoji et al. | 725/100 |
| 2006/0292980 | A1 | * | 12/2006 | Marcos Alba | 455/3.06 |
| 2006/0294562 | A1 | * | 12/2006 | Kikkoji et al. | 725/105 |
| 2007/0071418 | A1 | * | 3/2007 | Kikkoji et al. | 386/124 |
| 2007/0074262 | A1 | * | 3/2007 | Kikkoji et al. | 725/131 |
| 2007/0112862 | A1 | * | 5/2007 | Iwatsu et al. | 707/200 |
| 2007/0130598 | A1 | * | 6/2007 | Choi et al. | 725/100 |
| 2008/0282357 | A1 | * | 11/2008 | Sharpe | 726/27 |
| 2009/0015370 | A1 | * | 1/2009 | Rowse | 340/5.2 |

FOREIGN PATENT DOCUMENTS

| | | | | | |
|---|---|---|---|---|---|
| GB | | 2227143 A | * | 7/1990 | H04Q 7/04 |
| JP | | 01161925 A | * | 6/1989 | H04B 7/26 |
| WO | WO 02/11324 A2 | | 2/2002 | | |

OTHER PUBLICATIONS

"Specification of the radio data system (RDS) for VHF/FM sound broadcasting in the frequency range from 87.5 to 108.0 MHz", European Standard EN 50067, Apr. 1998, 132 pgs.

* cited by examiner

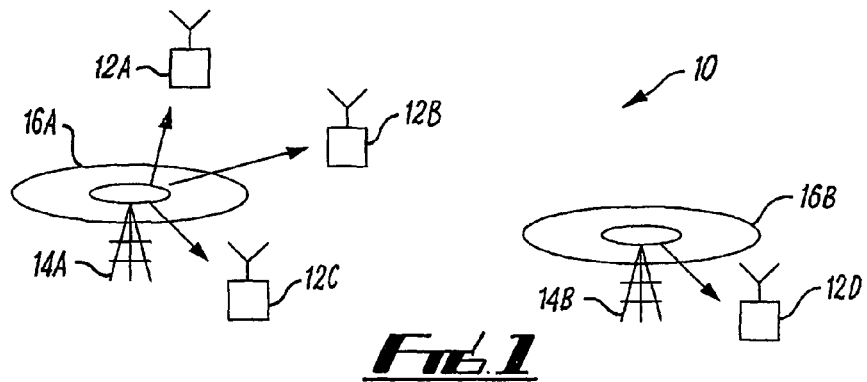
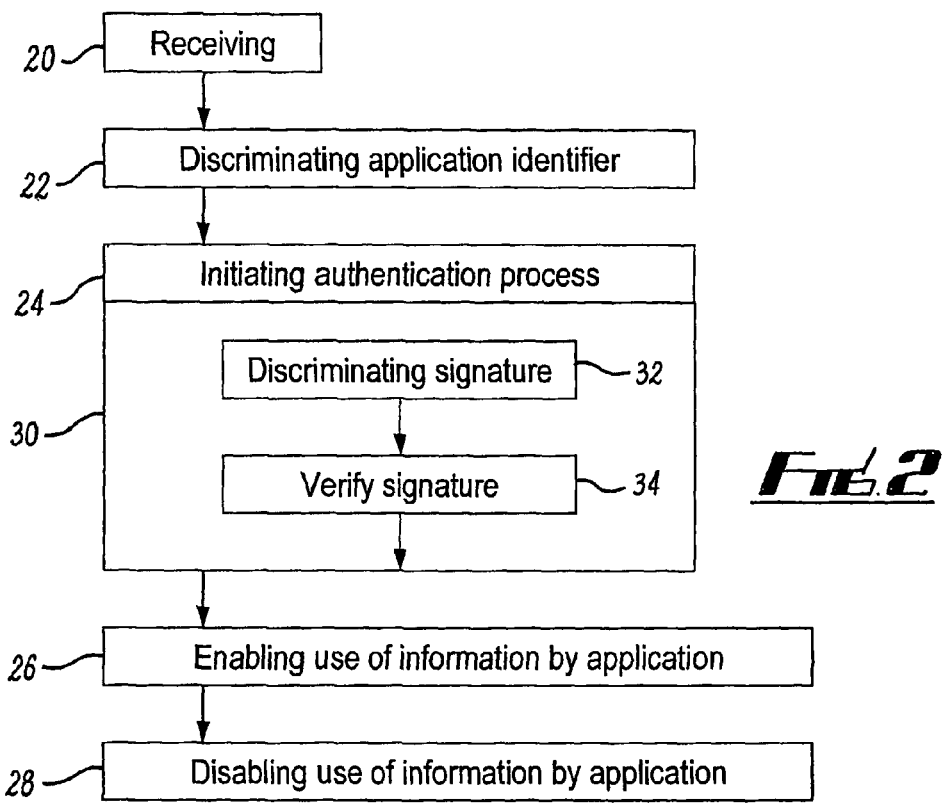
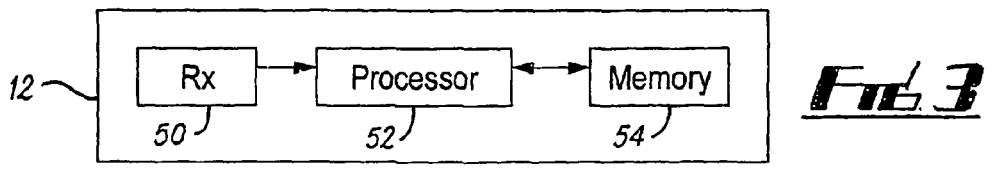

METHOD OF PROVIDING A RADIO SERVICE AT A REMOTE TERMINAL

FIELD OF THE INVENTION

Embodiments of the present invention relate to method of providing a radio service at a remote terminal. In particular, they relate to a method by which commercial radio stations may provide bespoke services.

BACKGROUND TO THE INVENTION

FIG. 1 illustrates a radio system 10 comprising a plurality of radio receiver terminals 12A, 12B, 12C, 12D and a plurality of broadcasting antennas 14A and 12B. In this example, each terminal is tuned to a broadcast radio channel 16A, 16B corresponding to a particular commercial radio station such as Jazz FM, for example. The frequency of the broadcast radio channel used for this radio station by the antennas 12A and 12B may differ, but the content of the information transmitted is the same.

Each terminal 12 converts at least some of the information received via the broadcast radio channel into audible sound. The user of a terminal is therefore able to listen to the audio content provided by the radio station to which the radio terminal is tuned.

The broadcast radio channel may also be used to communicate additional information by embedding it within the broadcast information. The additional information may be used to provide specified services such as traffic announcement TA and traffic programme TP or may be used to provide unspecified services such as open data applications (ODA).

According to the Radio Data Services (RDS) specification, the type 3A group conveys information about which Open Data Applications (ODA) are carried on a particular transmission and in which groups they will be found. The group 3A consists of two elements the Applications Identification (AID) code and the Application Group Type code used by the application. The Application Group Type code indicates the group type used, in the particular transmission, to carry the specified ODA information. The AID identifies which application the terminal needs to use. The identified application then uses the ODA information to provide a service at the terminal.

The inventor has realized that a problem may arise, if a malicious broadcaster masquerades as the radio station and provides unauthorized ODA information.

It would be desirable to enable a terminal to authenticate the received ODA information, but this is not straightforward in a broadcast or uni-directional radio channel.

BRIEF DESCRIPTION OF THE INVENTION

According to one embodiment of the invention there is provided a method of providing a service at a remote terminal comprising: receiving information broadcast by a commercial radio station in a broadcast radio channel; discriminating an identifier of an application within the received broadcast information; initiating an authentication process for authenticating broadcast information received via the broadcast channel; and in response to a positive authentication, enabling use of information received via the broadcast radio channel by the identified application.

According to another embodiment of the invention there is provided a terminal comprising: a receiver for receiving information broadcast by a commercial radio station in a broadcast radio channel; means for discriminating an identifier of an application within the received broadcast information; authentication means for authenticating broadcast information received via the broadcast channel; and control means for enabling/disabling the use of information received via the broadcast radio channel by the identified application, wherein in response to a positive authentication of the broadcast information received via the broadcast channel the control means enables the use of information received via the broadcast channel by the identified application.

According to another embodiment of the invention there is provided a method of simultaneously providing a service to a plurality of remote terminals comprising: broadcasting information in a broadcast radio channel comprising an identifier of an application and information for use by the identified application; and providing a digital key, for authenticating the broadcast information, to each of the plurality of remote terminals separately from the broadcast radio channel.

BRIEF DESCRIPTION OF THE DRAWINGS

For a better understanding of the present invention reference will now be made by way of example only to the accompanying drawings in which:

FIG. 1 illustrates a radio system comprising a plurality of terminals and antennas;

FIG. 2 illustrates a method performed at a terminal 12 for providing a service;

FIG. 3 schematically illustrates the functional components of a terminal.

DETAILED DESCRIPTION OF EMBODIMENTS OF THE INVENTION

A commercial radio station is able to simultaneously provide a service to the plurality of remote terminals 12 by broadcasting information in a broadcast radio channel. This broadcast information comprises an identifier of an application (AID) and service information for use by the identified application in providing a service at the terminal.

The broadcast information includes a type 3A group comprising an Applications Identification (AID) code and an Application Group Type code. The AID identifies the application to be used. The Application Group Type code indicates the group type used, in the particular transmission, to carry the service information used by the identified application to provide the service.

Each terminal receiving the broadcast information is able to provide a service by performing the method illustrated in FIG. 2. This method comprises: receiving, at step 20, information broadcast by a commercial radio station in a broadcast radio channel; discriminating, at step 22, an identifier of an application within the received broadcast information; initiating, at step 24, an authentication process 30 for authenticating broadcast information received via the broadcast channel; in response to a positive authentication, enabling, at step 26, use of information received via the broadcast radio channel by the identified application; and in response to a negative authentication, disabling, at step 28, use of information received via the broadcast radio channel by the identified application.

In more detail, at step 20 the terminal receives the broadcast information including a type 3A group comprising an Applications Identification (AID) code and a Application Group Type code. The AID identifies the application to be used. The Application Group Type code indicates the group type used, in the particular transmission, to carry the service information used by the identified application. At step 22 the terminal discriminates the identifier of the application (AID).

The service information used by the identified application typically includes a signature used in the authentication process. The authentication process 30 comprises discriminating, at step 32, the signature within the broadcast information and verifying, at step 34, the signature using a digital key.

The verifying step 34 may in one embodiment comprise creating a signature and comparing the created signature with the received signature. A match produces a positive authentication result whereas the absence of a match produces a negative authentication result. The signature is created using a process that is secret and symmetric with the process used to create the signature before its inclusion within the service information. Typically the symmetric process scrambles data using a digital key according to an algorithm. At least one of the data, digital key and algorithm is secret.

For example, in one implementation, the signature is created by scrambling a Julien calendar day number using a digital key (e.g. application identifier). If the Julien day number is even, then the signature is created by exclusive ORing the Julien day number and the digital key. If the Julien day number is odd, then the signature is created by ANDing the Julien day number and the digital key. The algorithm/data is time varying so the signature advantageously changes with time.

As another example, the signature may be created by scrambling specific data using a digital key ( e.g. the application identifier). The specific data may, for example, be the programme identification (PI) code, a programme service (PS) name, or a programme type (PTY) code.

The verifying step 34 may, in another embodiment, comprise descrambling the received signature and attempting to use the descrambled signature as input data to the identified application. A positive authentication result is indicated if the identified application is able to use the input data whereas a negative authentication result is indicated if the identified application is unable to use the input data. The descrambled signature is created using a process that is secret and the reverse of the process used to create the signature before its inclusion within the service information. The signature is created by scrambling all or part of the service information using the digital key. The terminal descrambles the signature using the same digital key. At least one of the digital key and algorithm is secret.

In one example, the digital key is created by scrambling a Julien calendar day number using a digital key (e.g. application identifier). If the Julien calendar day number is even, then the signature is created by exclusive ORing the Julien calendar day number and the digital key. If the Julien calendar day number is odd, then the signature is created by ANDing the Julien calendar day number and the digital key. The algorithm/data is time varying so the digital key changes with time and the signature changes with time even if the service information is repeated.

As another example, the digital key is created by scrambling specific data using a digital key ( e.g. application identifier). The specific data may, for example, be the programme identification (PI) code, a programme service (PS) name, or a programme type (PTY) code.

The application that uses the service information is typically a JAVA application downloaded to the terminal within a secure MIDlet. The MIDlet comprises a Java Application resource (JAR) and a Java application descriptor (JAD). The JAD typically comprises the application identifier (AID) and a digital certificate that signs the JAR and enables authentication of the origin of the MIDlet. The JAD typically comprises data enabling or defining the authentication process including the digital key, and the application itself. The MIDlet is typically downloaded from a trusted source that is verified by the digital certificate. The MIDlet is downloaded separately to the broadcast radio channel and is typically downloaded via a secure bi-directional communications channel. It may, for example, be downloaded from a web-site or pulled via a cellular telecommunications network.

The same MIDlet may be downloaded separately to each of the terminals. The same broadcast information may be simultaneously provided to each of the terminals and the terminals may simultaneously provide the same service at each of the terminals.

The MIDlet may be updated by the broadcaster at an appropriate point in time. This could be regularly, for example every month, or to coincide with an event such as a fund raising event for a charity. The MIDlet may be updated anytime the broadcaster wishes to provide an additional service at the terminal. The terminal need only obtain the updated MIDlet.

A radio station may therefore offer a bespoke service to its clients by suitable choice of the application downloaded to the terminals and the service information broadcast to the terminals.

The service may for example, display additional information about the music being played. It may also or alternatively provide an option for the user to purchase and download the music to the terminal, or if the terminal is a mobile cellular telephone, to purchase and download a ring-tone for the mobile telephone. These services may be provided by supplying links to web-sites for making the download or telephone numbers which are called to pull a data file.

The authentication of broadcast information may re-occur periodically or it may occur whenever the broadcast radio channel used to broadcast information changes i.e. the terminal receives the broadcast information from another antenna operating at a different frequency.

FIG. 3 illustrates the functional components of a terminal. The terminal comprises a receiver 50 for receiving information broadcast by a commercial radio station in a broadcast radio channel; a processor 52 and a memory 54.

The memory stores computer program instructions which when loaded into the processor 52 control the operation of the terminal and provide means for discriminating an identifier of an application within the received broadcast information; authentication means for authenticating broadcast information received via the broadcast channel; and control means for enabling/disabling the use of information received via the broadcast radio channel by the identified application. In response to a positive authentication, the control means enables the use of information received via the broadcast channel by the identified application. In response to a negative authentication, the control means disables the use of information received via the broadcast channel by the identified application.

Although embodiments of the present invention have been described in the preceding paragraphs with reference to various examples, it should be appreciated that modifications to the examples given can be made without departing from the scope of the invention as claimed. For example, although embodiments of the invention have been described with reference to RDS it should be appreciated that other embodiments use Digital Audio Broadcasting (DAB) radio. The application may be used to automatically launch other Java MIDlets in response to trigger data received from the radio station. For example, the applications may launch a stock tracker application to alert the user to a change in stock values in response to received broadcast information.

Although embodiments of the invention have been described with reference to the Radio Data Service (RDS), other embodiments of the invention use the Radio Broadcast Data System (RBDS).

I claim:

1. A method comprising:
   receiving at a remote terminal information broadcast by a commercial radio station in a broadcast radio channel, the commercial radio station having only uni-directional broadcast radio communication capability with respect to the remote terminal;
   discriminating an identifier of an application within the received broadcast information;
   initiating an authentication process for authenticating broadcast information received via the broadcast radio channel; and
   in response to a positive authentication, enabling use of information received via the broadcast radio channel by the identified application;
   wherein the authentication process is a uni-directional process that comprises discriminating a signature within the broadcast information received via the broadcast radio channel; and
   verifying the signature using a digital key that is downloaded to the terminal using a bi-directional communication channel that is separate from the broadcast radio channel, where the digital key periodically is changed by a broadcaster of the broadcast information.

2. A method as claimed in claim 1, wherein the digital key is associated with the radio station and the authentication process is for authenticating the origin of the received information as the radio station.

3. A method as claimed in claim 1, wherein the signature comprises data scrambled using the digital key before it is broadcast in the broadcast radio channel and the step of verifying the signature comprises descrambling the signature using the digital key to recover the data and verifying the data.

4. A method as claimed in claim 3, wherein data comprises a value that changes in time.

5. A method as claimed in claim 3, wherein the data identifies the radio station.

6. A method as claimed in claim 3, wherein the data is for use by the identified application.

7. A method as claimed in claim 1, further comprising downloading the application to the terminal.

8. A method as claimed in claim 7, wherein the authentication process is dependent upon the downloaded application.

9. A method as claimed in claim 8, wherein the authentication process uses the digital key that is downloaded to the terminal.

10. A method as claimed in claim 1, wherein the application is a JAVA application and is downloaded within a MIDlet.

11. A method as claimed in claim 10, wherein the MIDlet defines the authentication process.

12. A method as claimed in claim 10, wherein the MIDlet defines the digital key that is used in the authentication process.

13. A method as claimed in claim 10, wherein the MIDlet is a secure MIDlet comprising a digital certificate of the radio station.

14. A method as claimed in claim 10, wherein the MIDlet is downloaded via a cellular telecommunications network.

15. A method as claimed in claim 14, wherein the MIDlet is pulled via the cellular telecommunications network.

16. A method as claimed in claim 14, further comprising detecting when the broadcast radio channel changes during the provision of the service to a new broadcast radio channel;
   initiating the authentication process for authenticating broadcast information received; and
   in response to a positive authentication, enabling use of information received via the new broadcast radio channel by the identified application and in response to a negative authentication, disabling use of information received via the new broadcast radio channel by the identified application.

17. A method as claimed in claim 1 wherein the service is provided via the radio data service (RDS) open data application (ODA) and the identifier of an application within the received broadcast information is the application identifier (AID).

18. A terminal comprising:
   a receiver for receiving information from a uni-directional broadcast by a commercial radio station in a broadcast radio channel, where the terminal has only uni-directional broadcast reception radio communication capability with respect to the commercial radio station;
   a processor connected with a non-transitory memory that stores computer program instructions that when loaded into the processor control operations of the terminal, where the operations comprise discriminating an identifier of an application within the received broadcast information;
   authenticating broadcast information received via the broadcast channel; and
   enabling/disabling the use of information received via the broadcast radio channel by the identified application,
   wherein in response to a positive authentication of the broadcast information received via the broadcast radio channel enabling the use of information received via the broadcast channel by the identified application;
   wherein authenticating is a uni-directional process that comprises discriminating a signature within the broadcast information received via the broadcast channel; and
   verifying the signature using a digital key that is downloaded to the terminal using a bi-directional communication channel that is separate from the broadcast radio channel, where the digital key periodically is changed by a broadcaster of the broadcast information.

19. A method of simultaneously providing a service to a plurality of remote terminals comprising:
   broadcasting from a commercial radio station information in a uni-directional broadcast radio channel comprising an identifier of an application and information for use by the identified application, where the commercial radio station has only uni-directional broadcast radio communication capability with respect to each of the remote terminals; and
   providing a digital key, for authenticating the broadcast information, to each of the plurality of remote terminals, where the digital key is provided to each of the plurality of remote terminals separately from the uni-directional broadcast radio channel; wherein authenticating is a uni-directional process that comprises discriminating a signature included within the broadcast information received via the broadcast radio channel; and verifying the signature using the digital key that is downloaded to each of the remote terminals using a bi-directional communication channel that is separate from the broadcast radio channel, where the digital key periodically is changed by a broadcaster of the broadcast information; where the application is a JAVA application and is downloaded within a MIDIet where the MIDIet also defines the digital key used in the authentication process.

20. A method as claimed in claim 19, wherein the signature comprises data scrambled using the digital key.

21. A method as claimed in claim 20, wherein data comprises a value that changes in time.

22. A method as claimed in claim 20, wherein the data is a secret shared between the plurality of remote terminals.

23. A method as claimed in claim 20, wherein the data reliably identifies the radio station.

24. A method as claimed in claim 20, wherein the data is for use by the identified application.

25. A method as claimed in claim 19, further comprising providing the application separately from the broadcast radio channel.

26. A method as claimed in claim 19, wherein the MIDIet defines an authentication process.

27. A method as claimed in claim 19, wherein the MIDIet is a secure MIDIet comprising a digital certificate of the radio station broadcasting the information.

28. A method as claimed in claim 19, wherein the MIDIet is downloaded via a cellular telecommunications network.

29. A method as claimed in claim 28, wherein the MIDIet is pulled via the cellular telecommunications network.

30. A method as claimed in claim 1 wherein the service is provided via the radio data service (RDS) open data application (ODA) and the identifier of an application within the received broadcast information is the application identifier (AID).

* * * * *